(12) United States Patent
Kim et al.

(10) Patent No.: US 12,093,574 B2
(45) Date of Patent: Sep. 17, 2024

(54) APPARATUS AND METHOD FOR MANAGING INTEGRATED STORAGE BASED ON MEMORY

(71) Applicant: ELECTRONICS AND TELECOMMUNICATIONS RESEARCH INSTITUTE, Daejeon (KR)

(72) Inventors: Dae-Won Kim, Daejeon (KR); Sun-Wook Kim, Daejeon (KR); Su-Min Jang, Daejeon (KR); Jae-Geun Cha, Daejeon (KR); Hyun-Hwa Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/842,943

(22) Filed: Jun. 17, 2022

(65) Prior Publication Data
US 2022/0405021 A1 Dec. 22, 2022

(30) Foreign Application Priority Data

Jun. 21, 2021 (KR) .................. 10-2021-0080295
May 26, 2022 (KR) .................. 10-2022-0064902

(51) Int. Cl.
*G06F 3/06* (2006.01)
(52) U.S. Cl.
CPC .......... *G06F 3/0664* (2013.01); *G06F 3/0604* (2013.01); *G06F 3/0659* (2013.01); *G06F 3/067* (2013.01)

(58) Field of Classification Search
None
See application file for complete search history.

(56) References Cited

U.S. PATENT DOCUMENTS 8,464,238 B1 * 6/2013 Chakraborty ......... G06F 9/4411
717/173
9,268,667 B2 2/2016 Chen et al.
9,268,689 B1 * 2/2016 Chen ..................... G06F 21/53
(Continued)

FOREIGN PATENT DOCUMENTS

KR 10-2019-0045049 A 5/2019
KR 10-2019-0067938 A 6/2019
(Continued)

*Primary Examiner* — Brian R Peugh
(74) *Attorney, Agent, or Firm* — LRK PATENT LAW FIRM

(57) ABSTRACT

Disclosed herein are an apparatus and method for managing memory-based integrated storage. The apparatus includes one or more processors and executable memory for storing at least one program executed by the one or more processors. The at least one program converts data operation tasks in response to a request for access to memory-based integrated storage from a user, a single virtual disk of a virtual storage pool of the memory-based integrated storage converts a disk access command into a command for connecting to a storage backend depending on the data operation tasks, and conversion of the data operation tasks into the command includes target identification indicating which local storage of the memory-based integrated storage is to be used.

11 Claims, 5 Drawing Sheets

(56) References Cited

U.S. PATENT DOCUMENTS

| | | |
|---|---|---|
| 9,535,827 B2 | 1/2017 | Crossland et al. |
| 10,223,034 B2 | 3/2019 | Lee et al. |
| 10,452,280 B2 | 10/2019 | Franceschini et al. |
| 10,776,491 B2 | 9/2020 | Kim et al. |
| 11,327,686 B2 | 5/2022 | Kim et al. |
| 2012/0054745 A1* | 3/2012 | Yamashita .......... G06F 21/6209 718/1 |
| 2014/0013045 A1 | 1/2014 | Crossland et al. |
| 2019/0121899 A1 | 4/2019 | Kim et al. |
| 2020/0233585 A1 | 7/2020 | Confalonieri et al. |
| 2020/0383074 A1 | 12/2020 | Chang et al. |
| 2021/0311997 A1 | 10/2021 | Grocutt et al. |
| 2023/0106598 A1 | 4/2023 | Wallach |

FOREIGN PATENT DOCUMENTS

| | | |
|---|---|---|
| KR | 10-2021-0033054 A | 3/2021 |
| KR | 10-2021-0034618 A | 3/2021 |
| KR | 10-2021-0038285 A | 4/2021 |

\* cited by examiner

APPARATUS AND METHOD FOR MANAGING INTEGRATED STORAGE BASED ON MEMORY

CROSS REFERENCE TO RELATED APPLICATIONS

This application claims the benefit of Korean Patent Application No. 10-2021-0080295, filed Jun. 21, 2021, and No. 10-2022-0064902, filed May 26, 2022, which are hereby incorporated by reference in their entireties into this application.

BACKGROUND OF THE INVENTION

1. Technical Field

The present invention relates generally to storage technology in a cloud environment, and more particularly to technology for managing memory-based integrated storage.

2. Description of the Related Art

Recent cloud systems generate and manage integrated storage connected with storage provided thereby for virtual machines or container environments. In a single physical machine, multiple service (or user) applications or containers are generated and operated, and when multiple services are simultaneously run, load is concentrated on disk storage in which a virtual disk is present, which may degrade performance.

In order to further improve the performance of such a cloud, main memory may be used as a virtual disk. However, main memory has a disadvantage in that it is not able to store a large amount of data due to the limited capacity thereof.

Meanwhile, Korean Patent Application and Publication No. 10-2021-0038285, titled "Apparatus and method for managing integrated storage supporting hierarchical structure", discloses an apparatus and method for managing integrated storage that supports a hierarchical structure of cloud storage and non-cloud storage in a cloud-computing environment.

SUMMARY OF THE INVENTION

An object of the present invention is to integrate main memory, disk storage, and cloud storage so as to appear as a single storage unit, thereby providing both the high performance of the main memory and the large capacity of the disk storage to a virtual machine for a cloud.

In order to accomplish the above object, an apparatus for managing memory-based integrated storage according to an embodiment of the present invention includes one or more processors and executable memory for storing at least one program executed by the one or more processors. The at least one program receives a disk access command for a virtual storage pool of memory-based integrated storage from a user, compares the block ID of the disk access command with the block ID of a preset storage boundary of the memory-based integrated storage, and selects storage in which the disk access command is to be processed from the virtual storage pool based on the result of the comparison of the block IDs, thereby generating a single virtual disk storage unit.

Here, the memory-based integrated storage may be configured such that block IDs of main memory storage are mapped to a preset first block area, block IDs of disk storage are mapped to a second block area, and block IDs of cloud storage are mapped to a third block area.

Here, the memory-based integrated storage may be configured such that the first block ID of the second block area is mapped to a value greater than the last block ID of the first block area and the first block ID of the third block area is mapped to a value greater than the last block ID of the second block area.

Here, the memory-based integrated storage may be configured such that a first storage boundary is set between the first block area and the second block area and a second storage boundary is set between the second block area and the third block area.

Here, the at least one program may compare the block ID of the disk access command with block IDs based on the first storage boundary and the second storage boundary and select a block area corresponding to the value closest to the block ID of the disk access command.

Here, the at least one program may generate the single virtual disk storage unit corresponding to storage mapped to the selected block area.

Here, the at least one program may further receive requirements of the user and optimize the single virtual disk storage unit based on disk performance information included in the requirements of the user.

Also, in order to accomplish the above object, a method for managing memory-based integrated storage, performed by an apparatus for managing memory-based integrated storage, according to an embodiment of the present invention includes receiving a disk access request for a virtual storage pool of memory-based integrated storage from a user; and converting data operation tasks into a command for connecting to a storage backend depending on the access request. Here, depending on the operation tasks, a disk access command is converted into a command for connecting to the storage backend through a data distribution task of the virtual storage pool of the memory-based integrated storage, and conversion of the operation tasks into the command includes target identification indicating which local storage of the memory-based integrated storage is to be used.

Here, the memory-based integrated storage may be configured such that block IDs of main memory storage are mapped to a preset first block area, block IDs of disk storage are mapped to a second block area, and block IDs of cloud storage are mapped to a third block area.

Here, the memory-based integrated storage may be configured such that the first block ID of the second block area is mapped to a value greater than the last block ID of the first block area and the first block ID of the third block area is mapped to a value greater than the last block ID of the second block area.

Here, the memory-based integrated storage may be configured such that a first storage boundary is set between the first block area and the second block area and a second storage boundary is set between the second block area and the third block area.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
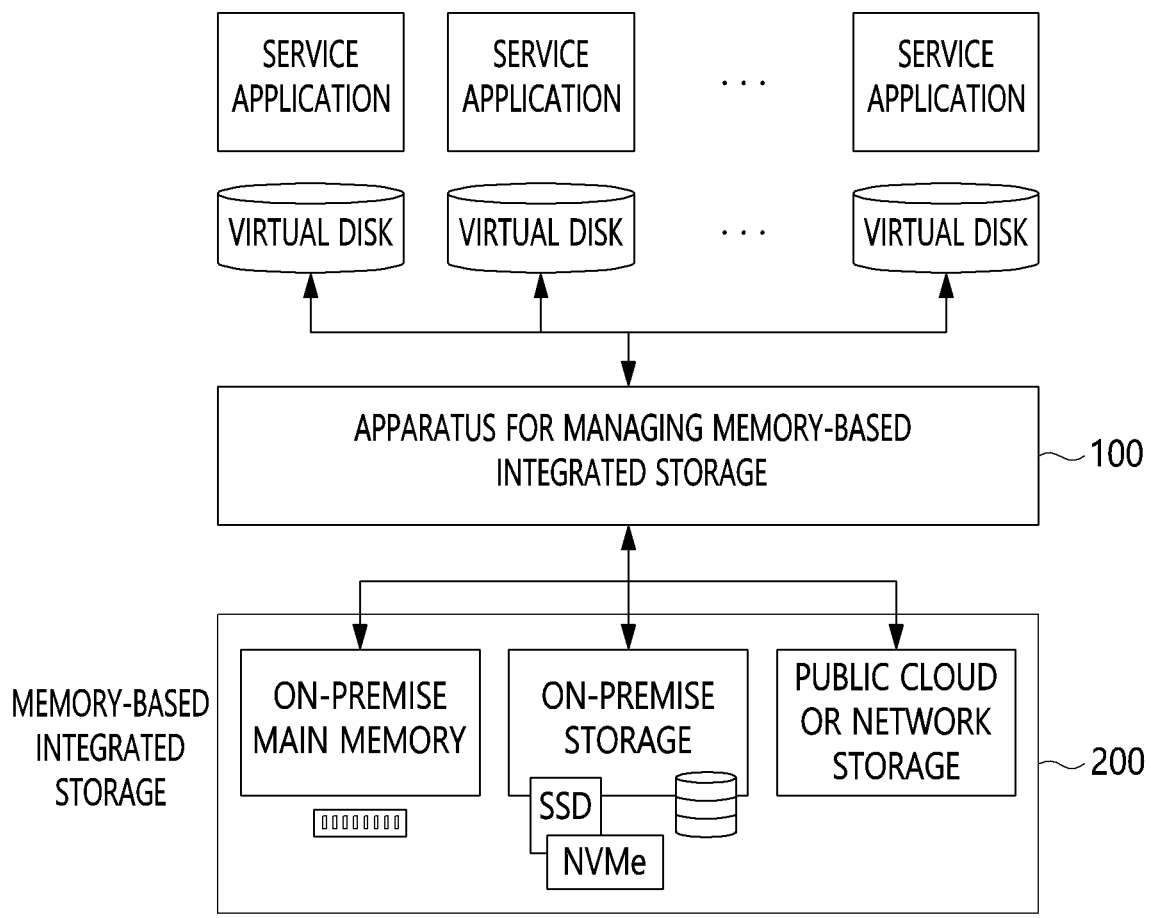
FIG. 1 is a view illustrating a system for managing memory-based integrated storage according to an embodiment of the present invention.

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

FIG. 1 is a view illustrating a system for managing memory-based integrated storage according to an embodiment of the present invention.

Referring to FIG. 1, it can be seen that the system for managing memory-based integrated storage according to an embodiment of the present invention is configured with service applications (based on virtual machines or containers), virtual disks, an apparatus 100 for managing memory-based integrated storage, the memory-based integrated storage 200, main memory, and disk storage or cloud storage.

The apparatus 100 for managing memory-based integrated storage may provide a single virtual disk, which is provided from a virtual storage pool, depending on the policy established by a user. The virtual storage pool may have different characteristics depending on the type of the device in which the virtual storage pool is generated (e.g., a DRAM-based storage pool, an SSD- or NVMe-based storage pool, an HDD-based storage pool, a network-based storage pool, and the like).

The characteristics of the virtual disk that is provided may vary depending on the device type of the virtual storage pool.

A user may select a single virtual disk generated in any of various types of virtual storage pools, thereby overcoming the difference in service performance.

For example, as illustrated in FIG. 1, a single virtual disk generated in a memory-based storage pool provides the fastest speed due to the characteristics of the device, and backend storage taking the form of a memory-based device also provides the fastest speed, but a backup is required in order to be prepared for data loss.

The apparatus 100 for managing memory-based integrated storage may receive a request for a single virtual disk of any of various types along with a data storage policy from a user, and may provide the type of each storage pool included in data operation metadata.

The apparatus 100 for managing memory-based integrated storage may use the memory-based integrated storage 200 in order to form a memory-based storage pool.

The apparatus 100 for managing memory-based integrated storage may provide a single virtual disk to the user depending on performance.

First, the apparatus 100 for managing memory-based integrated storage may acquire device information pertaining to the virtual storage pool and store the same.

Here, the apparatus 100 for managing memory-based integrated storage may monitor the I/O bandwidth of virtual storage.

Here, the apparatus 100 for managing memory-based integrated storage may request a single new virtual disk depending on the performance requirements of the user (e.g., I/O bandwidth, capacity information, device type, and the like).

Here, the apparatus 100 for managing memory-based integrated storage may select a virtual storage pool that meets the user requirements and generate a single virtual disk.

Here, the apparatus 100 for managing memory-based integrated storage may generate and provide an interface that meets the user requirements.

Also, the apparatus 100 for managing memory-based integrated storage may generate a virtual disk from a storage pool in the memory-based integrated storage 200 for a generally operating service, a user, a service application, and a container.

Also, the apparatus 100 for managing memory-based integrated storage may generate memory-based integrated storage that appears as a single storage unit by integrating main memory and disk storage.

Here, the memory-based integrated storage 200 provides a standard block storage interface, thereby enabling existing services to operate without modification.

Figure 2:
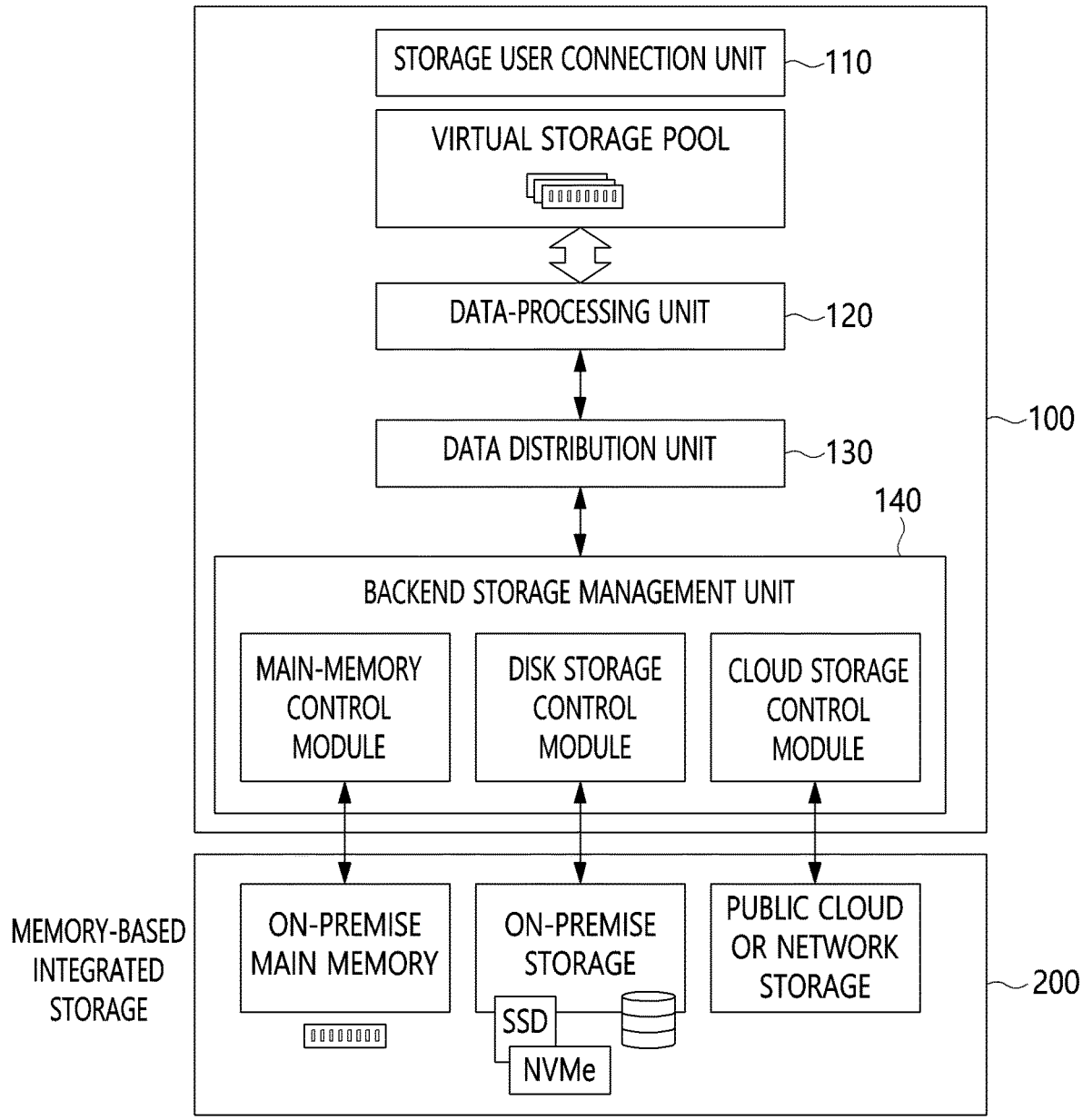
FIG. 2 is a block diagram illustrating an apparatus for managing memory-based integrated storage according to an embodiment of the present invention.

FIG. 2 is a block diagram illustrating an apparatus for managing memory-based integrated storage according to an embodiment of the present invention.

Referring to FIG. 2, the apparatus 100 for managing memory-based integrated storage according to an embodiment of the present invention may include a storage user connection unit 110, a data-processing unit 120, a data distribution unit 130, and a backend storage management unit 140.

The storage user connection unit 110 may receive a disk access command for a single virtual disk, which virtualizes integrated storage, from a service application (or a user).

Here, the virtual disk may be a single virtual disk of a virtual storage pool.

Here, the storage user connection unit 110 may register user requirements.

The user requirements may include a data storage capacity, an access mechanism, data mobility, the storage type of a single virtual disk, data security, performance information, a storage policy, and the like.

The performance information may include read/write I/O bandwidth, network bandwidth, a storage capacity, a storage type, I/O latency, network latency, and the like.

Here, the data-processing unit 120 may check the block ID of the disk access command.

The data-processing unit 120 may convert a data operation into commands corresponding to the integrated storage. The commands may include an API, an I/O interface, and the like.

Here, the data-processing unit 120 may convert data operation tasks according to the access request into a command for connecting to a storage backend.

Here, according to the data operation tasks, the disk access command may be converted into a command for establishing a connection to the storage backend through a data distribution process performed by the virtual storage pool of the memory-based integrated storage.

Here, conversion of the operation tasks into the command may include target identification indicating which local storage of the memory-based integrated storage is to be used.

The block ID of the disk access command may be checked and compared with a storage boundary.

Here, the data-processing unit 120 may check the block ID of the disk access command, and may transfer the disk access command to a main-memory control module when the block ID is equal to or less than the storage boundary.

Here, the data-processing unit 120 may process the disk access command using high-speed main memory storage.

Here, the data-processing unit 120 may check the block ID of the disk access command, and may transfer the disk access command to a disk storage control module when the block ID is greater than the storage boundary.

Here, the data-processing unit 120 may process the disk access command using a large amount of disk storage.

Here, the data-processing unit 120 may check the block ID of the disk access command, and may transfer the disk access command to a cloud storage control module when the block ID is greater than the storage boundary.

Here, the data-processing unit 120 may process the disk access command using cloud storage.

The data distribution unit 130 may transfer the disk access command (read or write command) for the single virtual disk of the virtual storage pool to the backend storage management unit such that the backend storage management unit converts the disk access command into a corresponding command through data distribution and storage.

Conversion of a data operation into a command may include a task for checking target identification indicating which local storage of the integrated storage is to be used. The target identification may include a physical address, a block ID, and a target API used by the corresponding local storage.

The backend storage management unit 140 may include a main-memory control module, a disk storage control module, and a cloud storage control module.

Here, the backend storage management unit 140 may generate memory-based integrated storage appearing as a single storage unit by integrating main memory and disk storage.

Here, the backend storage management unit 140 may process the disk access command by integrating the main memory and the disk storage.

Here, the backend storage management unit 140 may provide various storage types of the virtual storage pool using an interface for connecting to the integrated storage.

The various storage types include main memory, an SSD, NVMe, an HDD-based storage pool, a network-based storage pool, and the like. The virtual storage pool may include a storage area mapped between a single unified storage disk and different types of integrated storage units having a combined direct interface.

Here, the backend storage unit 140 may provide a single virtual disk to a user depending on the requirements of the user.

Here, the user may select the single virtual disk having the lowest latency, the best bandwidth, the greatest capacity, or the like depending on performance information.

Here, the backend storage management unit 140 may reduce the amount of space required for storing data using a function of deduplicating stored data. Deduplication may be performed in the virtual storage pool and the local storage of the integrated storage corresponding to the main memory.

Here, the backend storage management unit 140 may optimize the virtual storage pool in consideration of the characteristics of the local storage.

The characteristics of the local storage that is optimized may include storage mirroring, storage prioritization, the physical access location of a user, and information about a combination thereof.

Here, the backend storage management unit 140 may optimize a single virtual disk in consideration of the requirements of the user.

Optimization of the single virtual disk may pertain to a storage capacity, data stability, storage performance, mobility of a service environment, and the performance thereof.

Also, the storage user connection unit 110 may provide an interface of a standard block storage format, and may receive a disk access command generated in the user application.

The storage user connection unit 110 may transfer the received command to the data distribution unit 130.

Depending on the characteristics of the disk access command, the data distribution unit 130 may determine whether to use main memory storage or disk storage in order to provide service.

Here, the data distribution unit 130 may transfer the access command to the main-memory control module or the disk storage control module and the cloud storage control module of the backend storage management unit 140.

The main-memory control module processes the disk access command using main memory, thereby providing high-speed access.

Here, in response to the disk access command transferred in units of blocks, the main-memory control module may perform actual read/write operations on the main memory, which is accessible by address.

Here, the main-memory control module may store data of the virtual disk in the main memory.

The disk storage control module may process the virtual disk access command using the disk storage.

The cloud storage control module may process the virtual disk access command using the cloud storage.

Figure 3:
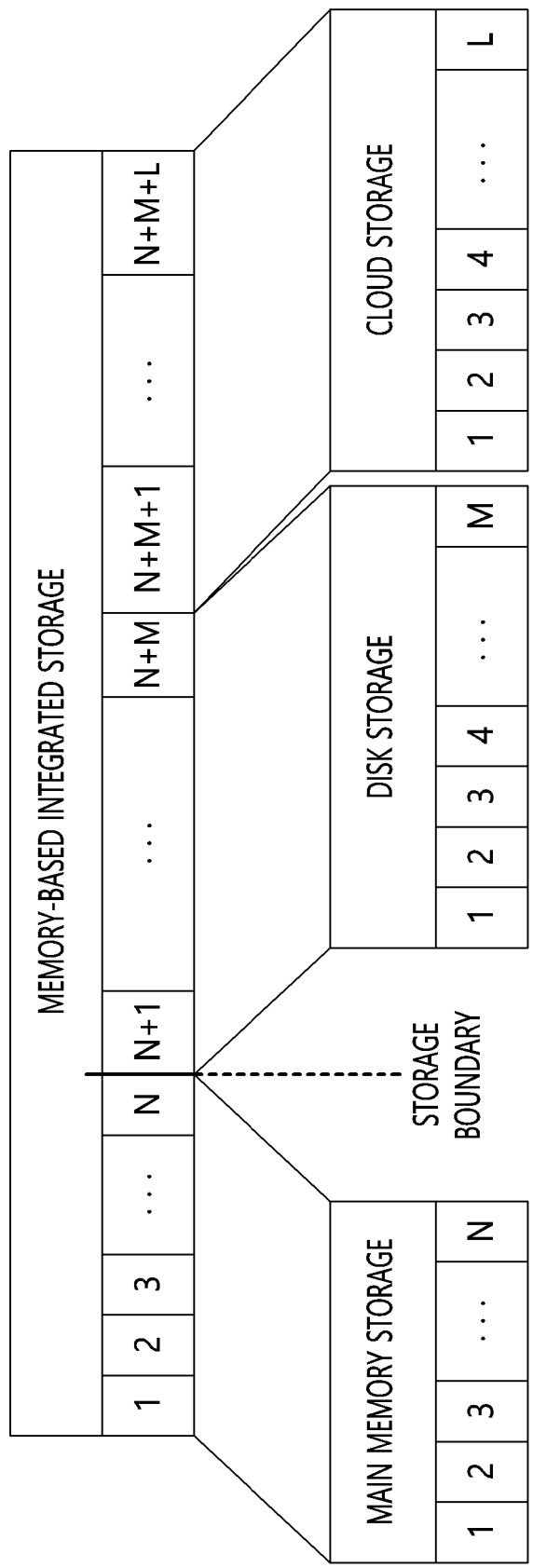
FIG. 3 is a view illustrating a process of generating memory-based integrated cloud storage according to an embodiment of the present invention.

FIG. 3 is a view illustrating a process of generating memory-based integrated cloud storage according to an embodiment of the present invention.

Referring to FIG. 3, it can be seen that a process of generating a single memory-based integrated storage unit by integrating main memory storage and disk storage is illustrated. The memory-based integrated storage provides a standard block storage format. The memory-based integrated storage is configured such that a main memory storage area is mapped to the front part thereof and a disk storage area is mapped to the rear part thereof.

Block IDs 1 to N of the main memory storage may be mapped to block IDs 1 to N of the memory-based integrated storage. Block IDs 1 to M of the disk storage may be mapped to block IDs N+1 to N+M of the memory-based integrated storage. Also, block IDs 1 to L of the cloud storage may be mapped to block IDs N+M+1 to N+M+L of the memory-based integrated storage. In the memory-based integrated storage, storage boundaries may be set between the block having an ID of N and the block having an ID of N+1 and between the block having an ID of M and the block having an ID of M+1. Extension of the block concept may be realized through extension across storage devices.

Figure 4:
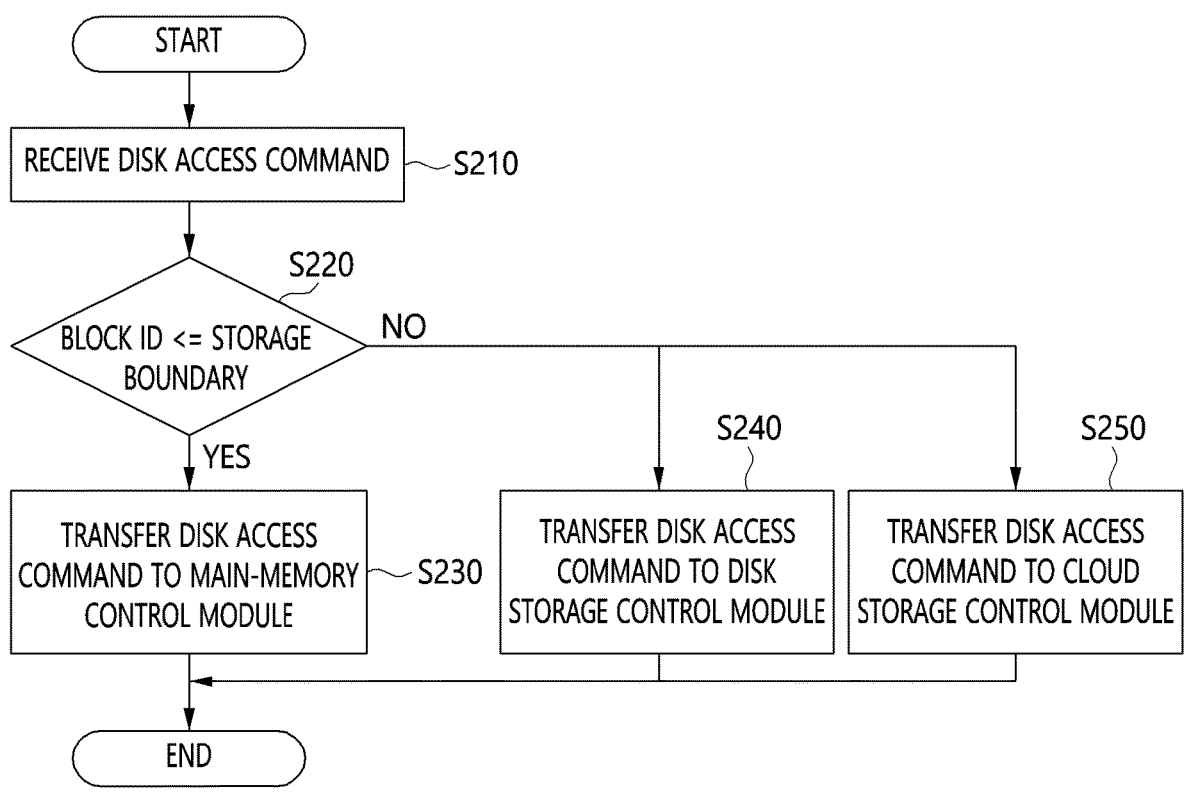
FIG. 4 is a flowchart illustrating a method for managing memory-based integrated storage according to an embodiment of the present invention.

FIG. 4 is a flowchart illustrating a method for managing memory-based integrated storage according to an embodiment of the present invention.

Referring to FIG. 4, in the method for managing memory-based integrated storage according to an embodiment of the present invention, a disk access command for a single virtual disk, which virtualizes integrated storage, may be received from a service application (or a user) at step S210.

Here, the virtual disk may correspond to a single virtual disk of a virtual storage pool.

Also, in the method for managing memory-based integrated storage according to an embodiment of the present invention, the block ID of the disk access command may be checked at step S220.

That is, at step S220, the block ID of the disk access command may be checked and compared with a storage boundary.

Here, the memory-based integrated storage may be configured such that the block IDs of main memory storage are mapped to a preset first block area, the block IDs of disk storage are mapped to a second block area, and the block IDs of cloud storage are mapped to a third block area.

Here, the memory-based integrated storage may be configured such that the first block ID of the second block area is mapped to a value greater than the last block ID of the first block area and such that the first block ID of the third block area is mapped to a value greater than the last block ID of the second block area.

Here, the memory-based integrated storage may be configured such that a first storage boundary is set between the first block area and the second block area and a second storage boundary is set between the second block area and the third block area.

Connection of a block of the cloud storage follows a corresponding API or protocol provided by the cloud, and when storage is connected, a protocol such as NFS, SAN, or the like may be applied through a network protocol.

Here, at step S220, the block ID of the disk access command is compared with block IDs based on the first storage boundary and the second storage boundary, and the block area corresponding to a value closest to the block ID of the disk access command may be selected.

Here, at step S220, the block ID of the disk access command is checked, and when the block ID is equal to or less than the storage boundary, the disk access command may be transferred to a main-memory control module at step S230.

Here, at step S230, the disk access command may be processed using high-speed main memory storage.

Here, at step S230, a single virtual disk storage unit corresponding to the main memory storage mapped to the selected block area may be generated.

Here, at step S230, the requirements of the user are received from the user, and the single virtual disk storage unit may be optimized based on disk performance information included in the requirements of the user.

Also, at step S220, the block ID of the disk access command is checked, and when the block ID is greater than the storage boundary, the disk access command may be transferred to a disk storage control module at step S240.

Here, at step S240, the disk access command may be processed using a large amount of disk storage.

Here, at step S240, a single virtual disk storage unit corresponding to the disk storage mapped to the selected block area may be generated.

Here, at step S240, the requirements of the user are received from the user, and the single virtual disk storage unit may be optimized based on disk performance information included in the requirements of the user.

Also, at step S220, the block ID of the disk access command is checked, and when the block ID is greater than the storage boundary, the disk access command may be transferred to a cloud storage control module at step S250.

Here, at step 5250, the disk access command may be processed using cloud storage.

Here, at step 5250, a single virtual disk storage unit corresponding to the cloud storage mapped to the selected block area may be generated.

Here, at step 5250, the requirements of the user are received from the user, and the single virtual disk storage unit may be optimized based on disk performance information included in the requirements of the user.

The main memory storage may use memory as a RAM disk and may use a nonvolatile block device along therewith in a synchronous or asynchronous manner by connecting data of the RAM disk to other storage. This is convenient because a backup to the connected block is capable of being performed.

The main memory storage may recover data from the disk storage to the RAM disk of the main memory storage when a backup is started. During the recovery process, an SBR module is able to provide normal service without interruption.

In a synchronous backup mode, the main memory storage may store all received data both in the RAM disk and in the disk storage at the same time. The main memory storage may complete writing to an upper layer when storage of the data in the two devices is completed.

In an asynchronous backup mode, the main memory storage may store received data only in the RAM disk. A kernel thread in the main memory storage may store dirty data of the RAM disk in the disk storage in order of Least Recently Written (LRW).

The capacity of the main memory storage may be set to the capacity of the disk storage. The RAM disk may be used for data in an area, the size of which is equal to or less than the RAM size, and data in an area, the size of which is greater than the RAM size, may be directly serviced from the disk storage.

In a general virtualization environment, a virtual disk including Operating System (OS) data for running a virtual machine or a container may be generated at the outset. The OS data generated at the beginning of operation of memory-based integrated storage may be serviced from main memory storage, which provides high performance.

Accordingly, the apparatus for managing memory-based integrated storage according to an embodiment of the present invention stores OS data, which most strongly affects the speed of a service application, in main memory, thereby operating a high-speed virtual machine.

Here, the apparatus for managing memory-based integrated storage according to an embodiment of the present invention may continuously generate user data when it operates a service (user) application, and may store the data in disk storage when the size thereof exceeds the capacity of the main memory.

Even though the user data is stored in the disk storage, it has little effect on service operation performance. Also, a large amount of user data may be stored in the disk storage having a large capacity.

Accordingly, the apparatus for managing memory-based integrated storage according to an embodiment of the present invention may support high performance by storing OS data, which is important for the speed of an application service, in main memory, and may overcome the limits on the capacity of the main memory by storing a large amount of user data in disk storage.

Figure 5:
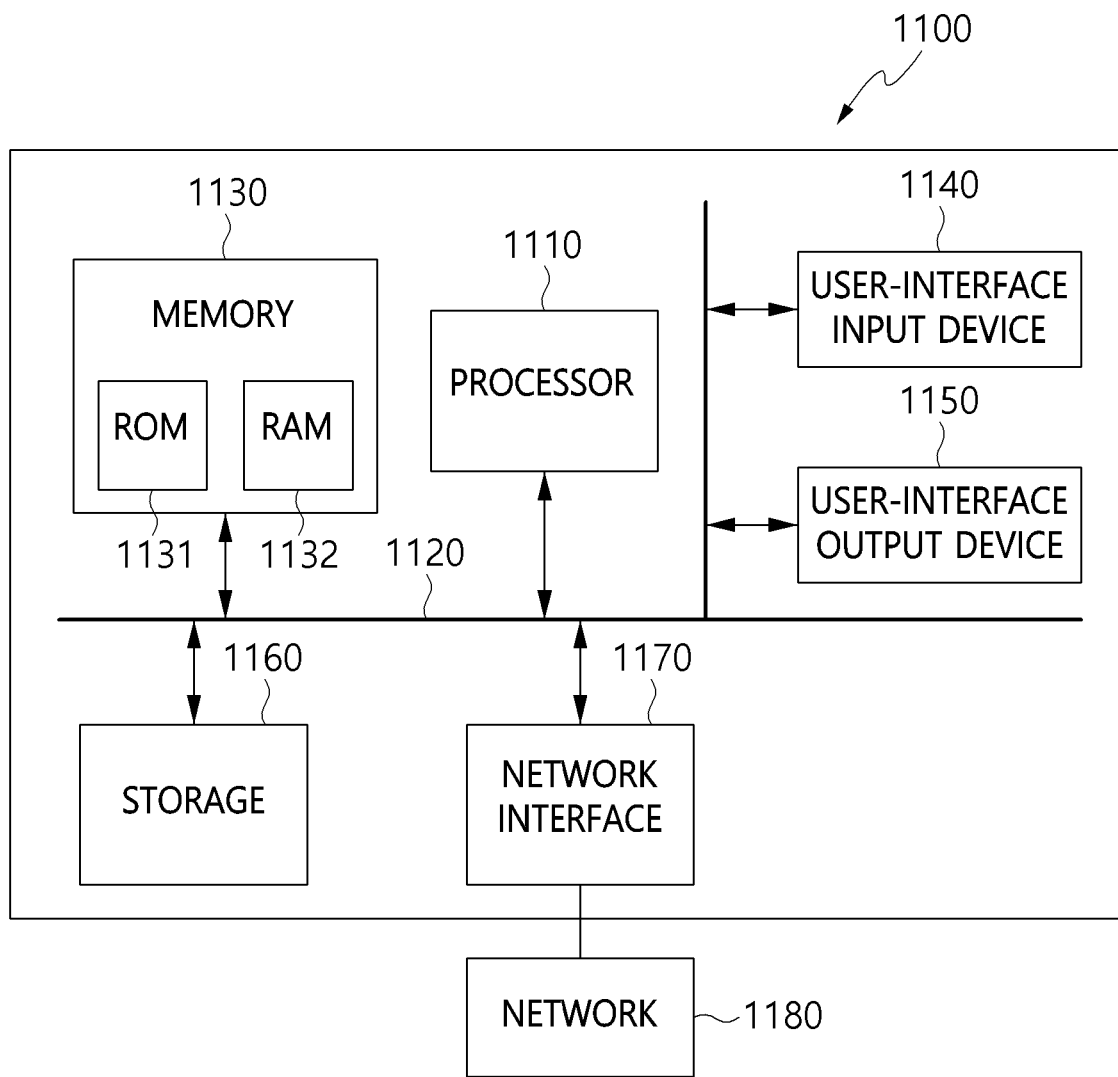
FIG. 5 is a view illustrating a computer system according to an embodiment of the present invention.

FIG. 5 is a view illustrating a computer system according to an embodiment of the present invention.

Referring to FIG. 5, the apparatus 100 for managing memory-based integrated storage according to an embodiment of the present invention may be implemented in a computer system 1100 including a computer-readable recording medium. As illustrated in FIG. 5, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus for managing memory-based integrated storage according to an embodiment of the present invention includes one or more processors 1110 and executable memory 1130 for storing at least one program executed by the one or more processors 1110. The at least one program converts data operation tasks in response to a request for access to memory-based integrated storage from a user, a single virtual disk of a virtual storage pool of the memory-based integrated storage converts a disk access command into a command for connecting to a storage backend depending on the data operation tasks, and conversion of the operation tasks into the command includes target identification indicating which local storage of the memory-based integrated storage is to be used.

Here, the memory-based integrated storage may be configured such that block IDs of main memory storage are mapped to a preset first block area, block IDs of disk storage are mapped to a second block area, and block IDs of cloud storage are mapped to a third block area.

Here, the memory-based integrated storage may be configured such that the first block ID of the second block area is mapped to a value greater than the last block ID of the first block area and the first block ID of the third block area is mapped to a value greater than the last block ID of the second block area.

Here, the memory-based integrated storage may be configured such that a first storage boundary is set between the first block area and the second block area and a second storage boundary is set between the second block area and the third block area.

Here, the at least one program may compare the block ID of the disk access command with block IDs based on the first storage boundary and the second storage boundary, and may select a block area corresponding to the value closest to the block ID of the disk access command.

Here, the at least one program may generate a single virtual disk storage unit corresponding to the storage mapped to the selected block area.

Here, the at least one program may further receive the requirements of the user, and may optimize the single virtual disk storage unit based on disk performance information included in the requirements of the user.

The present invention integrates main memory, disk storage, and cloud storage so as to appear as a single storage unit, thereby providing both the high performance of the main memory and the large capacity of the disk storage to a virtual machine for a cloud.

As described above, the apparatus and method for managing memory-based integrated storage according to the present invention are not limitedly applied to the configurations and operations of the above-described embodiments, but all or some of the embodiments may be selectively combined and configured, so the embodiments may be modified in various ways.

What is claimed is:

1. An apparatus for managing memory-based integrated storage, comprising:
   one or more processors; and
   executable memory for storing at least one program executed by the one or more processors,
   wherein the at least one program converts data operation tasks in response to a request for access to memory-based integrated storage from a user,
   the memory-based integrated storage includes a main memory storage, a disk storage and a cloud storage, and composes a single virtual storage,
   wherein a disk access command in the data operation is converted into a read or write command for connecting to a backend storage management by a data distribution process,
   wherein the data distribution process transfers the disk access command in the data operation to the backend storage management and the backend storage management converts the disk access command into the read or write command for a corresponding storage in the single virtual storage, and
   when the data operation is converted into the read or write command, a target identification is checked,
   wherein the target identification indicates which type of storage of the memory-based integrated storage is to be used and the target identification includes a physical address, a block ID, and a target API used in the corresponding storage.

2. The apparatus of claim 1, wherein the memory-based integrated storage is configured such that block identifiers (IDs) of the main memory storage are mapped to a preset first block area, block IDs of the disk storage are mapped to a second block area, and block IDs of the cloud storage are mapped to a third block area.

3. The apparatus of claim 2, wherein the memory-based integrated storage is configured such that a first block identifier (ID) of the second block area is mapped to a value greater than a last block ID of the first block area and a first block ID of the third block area is mapped to a value greater than a last block ID of the second block area.

4. The apparatus of claim 3, wherein the memory-based integrated storage is configured such that a first storage boundary is set between the first block area and the second block area and a second storage boundary is set between the second block area and the third block area.

5. The apparatus of claim 4, wherein the at least one program compares a block ID of the disk access command with block IDs based on the first storage boundary and the second storage boundary and selects a block area corresponding to a value closest to the block ID of the disk access command.

6. The apparatus of claim 5, wherein the at least one program generates the single virtual disk corresponding to storage mapped to the selected block area.

7. The apparatus of claim 6, wherein the at least one program further receives requirements of the user and optimizes the single virtual disk based on disk performance information included in the requirements of the user.

8. A method for managing memory-based integrated storage, performed by an apparatus for managing memory-based integrated storage, comprising:
  receiving a request for access to a memory-based integrated storage from a user,
    wherein the memory-based integrated storage includes a main memory storage, a disk storage and a cloud storage, and the memory-based integrated storage composes a single virtual storage; and
  in response to the request, converting a disk access command in data operation into a read or write command for connecting to a backend storage management by a data distribution process,
  wherein the data distribution process transfers the disk access command in the data operation to the backend storage management and the backend storage management converts the disk access command into the read or write command,
  wherein when the data operation is converted into the read or write command, a target identification is checked, and
  wherein the target identification indicates which type of storage of the memory-based integrated storage is to be used and the target identification includes a physical address, a block ID, and a target API used in the corresponding storage.

9. The method of claim 8, wherein the memory-based integrated storage is configured such that block identifiers (IDs) of the main memory storage are mapped to a preset first block area, block IDs of the disk storage are mapped to a second block area, and block IDs of the cloud storage are mapped to a third block area.

10. The method of claim 9, wherein the memory-based integrated storage is configured such that a first block identifier (ID) of the second block area is mapped to a value greater than a last block ID of the first block area and a first block ID of the third block area is mapped to a value greater than a last block ID of the second block area.

11. The method of claim 10, wherein the memory-based integrated storage is configured such that a first storage boundary is set between the first block area and the second block area and a second storage boundary is set between the second block area and the third block area.

* * * * *